United States Patent
Shiota et al.

(10) Patent No.: US 7,231,580 B2
(45) Date of Patent: Jun. 12, 2007

(54) NONVOLATILE MEMORY APPARATUS AND DATA PROCESSING SYSTEM

(75) Inventors: Shigemasa Shiota, Tachikawa (JP); Hiroyuki Goto, Higashimurayama (JP); Hirofumi Shibuya, Matsuda (JP); Fumio Hara, Higashikurume (JP); Kinji Mitani, Higashimurayama (JP)

(73) Assignee: Renesas Technology Corp., Tokyo (JP)

( * ) Notice: Subject to any disclaimer, the term of this patent is extended or adjusted under 35 U.S.C. 154(b) by 445 days.

(21) Appl. No.: 10/714,982

(22) Filed: Nov. 18, 2003

(65) Prior Publication Data

US 2004/0187052 A1 Sep. 23, 2004

(30) Foreign Application Priority Data

Mar. 17, 2003 (JP) ............................. 2003-072130

(51) Int. Cl.
*G11C 29/42* (2006.01)
*G11C 29/52* (2006.01)
*H03M 13/29* (2006.01)

(52) U.S. Cl. ...................... 714/765; 714/704; 714/710; 714/763; 714/773

(58) Field of Classification Search ................ 714/710, 714/765, 773
See application file for complete search history.

(56) References Cited

U.S. PATENT DOCUMENTS 5,463,644 A * 10/1995 Rodi et al. .................. 714/765

2003/0172328 A1 * 9/2003 Wyatt et al. ................. 714/704

FOREIGN PATENT DOCUMENTS

| JP | 4-95299 | 3/1992 |
|----|---------|--------|
| JP | 6-161906 | 6/1994 |

\* cited by examiner

*Primary Examiner*—R. Stephen Dildine
(74) *Attorney, Agent, or Firm*—Miles & Stockbridge P.C.

(57) ABSTRACT

The reliability of data is significantly increased without considerably increasing costs by performing minor data corrections within an information storage device and performing major error corrections in an information processing device. When a request to transfer user data for reading is issued from an information processing device, a control circuit transfers the user data and management data to an error detection circuit, which checks the user data for errors. If the user data contains no error, the control circuit notifies the information processing device that the user data can be transferred, and transfers it to the information processing device. If the user data contains errors, an X count error position and correction data calculation circuit uses the user data and the management data to calculate correction locations and correction data, and judges whether the correction locations are correctable. If uncorrectable (there are more correction locations than X locations), the control circuit notifies the information processing device that the user data is uncorrectable, and then transfers the user data and the management data to the information processing device.

3 Claims, 7 Drawing Sheets

NONVOLATILE MEMORY APPARATUS AND DATA PROCESSING SYSTEM

BACKGROUND OF THE INVENTION

The present invention relates to the technology for increasing reliability in an information processing system, and more particularly to the technology effectively applied to data protection in an information storage device configured using a nonvolatile semiconductor memory.

Information storage devices such as CF (Compact Flash) cards, smart media, memory sticks, and multimedia cards are widely known as external storage media of personal computers, multi-function terminals, and the like.

In some of these information storage devices, the reliability of read/write data is increased by calculating error positions and error correction data in a host device.

Also, some of the information storage devices increase the reliability of read/write data by providing an error detection circuit. In this case, in reading/writing of data, data required to have high reliability is subjected to an error detection circuit in correction mode, while data not required to have high reliability is not subjected to the error detection circuit (e.g., Patent Publication 1). Some of the information storage devices perform optimum error corrections by changing correction capability according to access speeds (e.g., Patent Publication 2).

[Patent Publication 1]
 Japanese Unexamined Patent Publication No. Hei 4 (1992)-95299

[Patent Publication 2]
 Japanese Unexamined Patent Publication No. Hei 6 (1994)-161906

SUMMARY OF THE INVENTION

It has been found by the inventor that the error detection technologies in read/write processing of the above-described information storage devices have problems as described below.

For example, there is a problem in that, since the host device calculates error positions and correction data by software, the performance of the host device is significantly reduced.

Also, in the case where the information storage devices are provided with an error detection circuit, if data corrections are performed for all error data, the error correction circuit increases in size, so that the information storage devices increase in size, leading to an increase in costs.

An object of the present invention is to provide an information storage device and an information processing system that perform only minor data corrections within the information storage device and perform major error corrections in the information processing system, and thereby can minimize an increase in costs without reducing the processing performance of the information processing system, and can significantly increase the reliability of data without increasing circuit sizes.

The foregoing and other objects, and novel features of the present invention will become apparent from this specification and the accompanying drawings.

Representative examples of the invention disclosed in the present application will be briefly described below.

(1) An information storage device of the present invention includes: one or more semiconductor memories; an information processing part that, according to an operation program, reads data stored in the one or more semiconductor memories and directs predetermined processing, data writing, and other operations; and a transfer processing part that, if read data read from the semiconductor memories contains minor errors, corrects the minor errors and transfers the read data, and if the read data contains major errors, transfers the read data without correcting the major errors.

Although the distinction between the minor errors and the major errors should be determined from the size of an error detection circuit and the frequency of occurrence of errors, the minor errors refer to errors the number of which is equal to or less than a predetermined number (e.g., one though not specially limited), and the major errors refer to errors the number of which is more than the predetermined number (e.g., two or more though not explicitly defined).

Other examples of the invention of the present application will be briefly described below.

(2) An information storage device of the present invention includes: one or more semiconductor memories; an information processing part that, according to an operation program, reads data stored in the one or more semiconductor memories and directs predetermined processing, data writing, and other operations; and a transfer processing part that, if read data read from the semiconductor memories contains one error, corrects the error and transfers the read data, and if the read data contains two or more errors, transfers the read data to the outside without correcting the errors.

(3) An information processing system comprises: an information storage device including one or more semiconductor memories, and an information processing part that, according to an operation program, reads data stored in the one or more semiconductor memories and directs predetermined processing, data writing, and other operations; and an information processing device managing the information storage device, wherein the information storage device includes a transfer processing part that, if read data read from the semiconductor memories contains minor errors, corrects the minor errors and transfers the data, and if the read data contains major errors, transfers the data without correcting the major errors, and the information processing device includes a second data correction and calculation part that corrects the read data containing the major errors transferred from the information storage device.

DETAILED DESCRIPTION OF THE PREFERRED EMBODIMENTS

Hereinafter, embodiments of the present invention will be described in detail with reference to the drawings.

Figure 1:
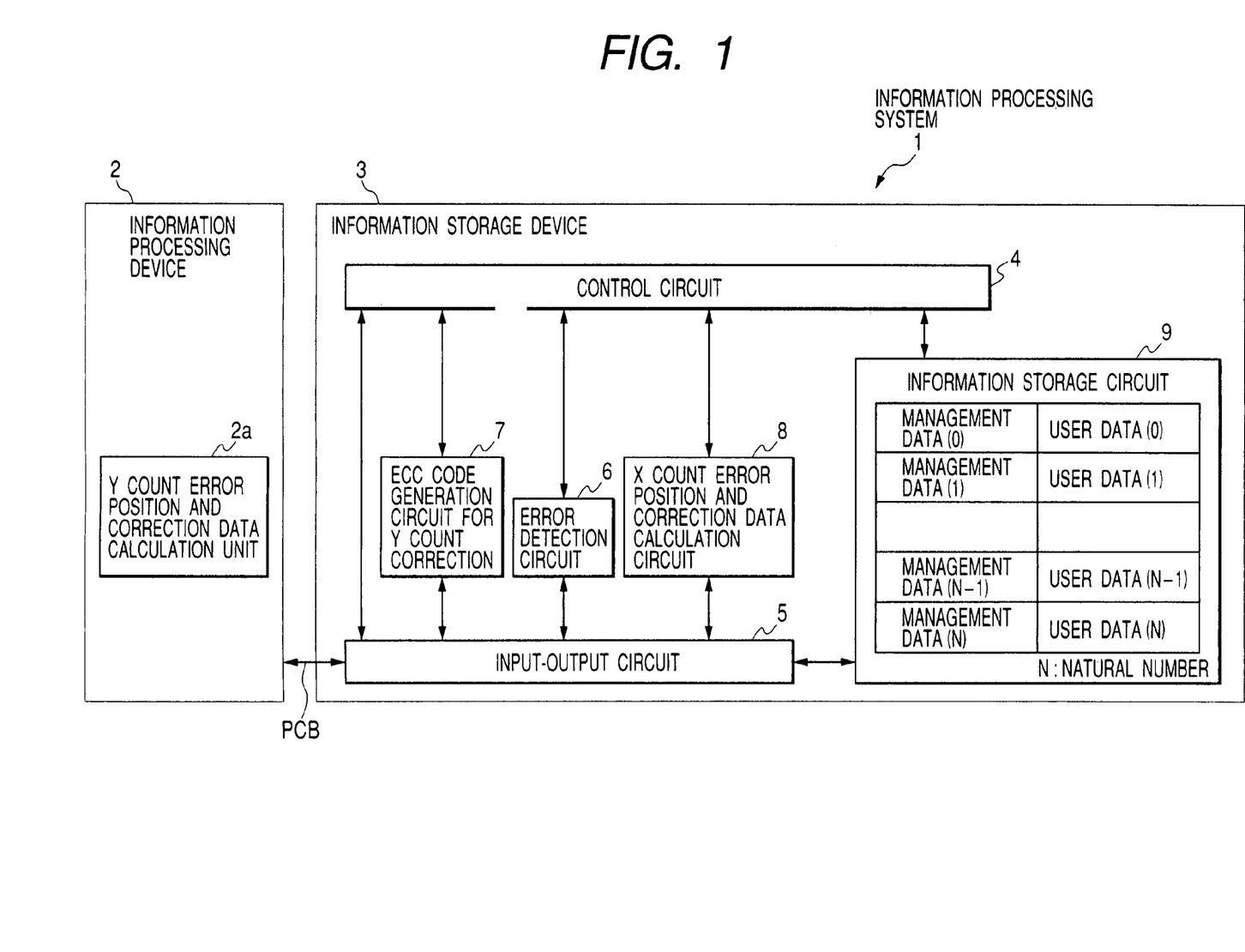
FIG. 1 is a block diagram showing an information processing system according to an embodiment of the present invention.
Figure 2:
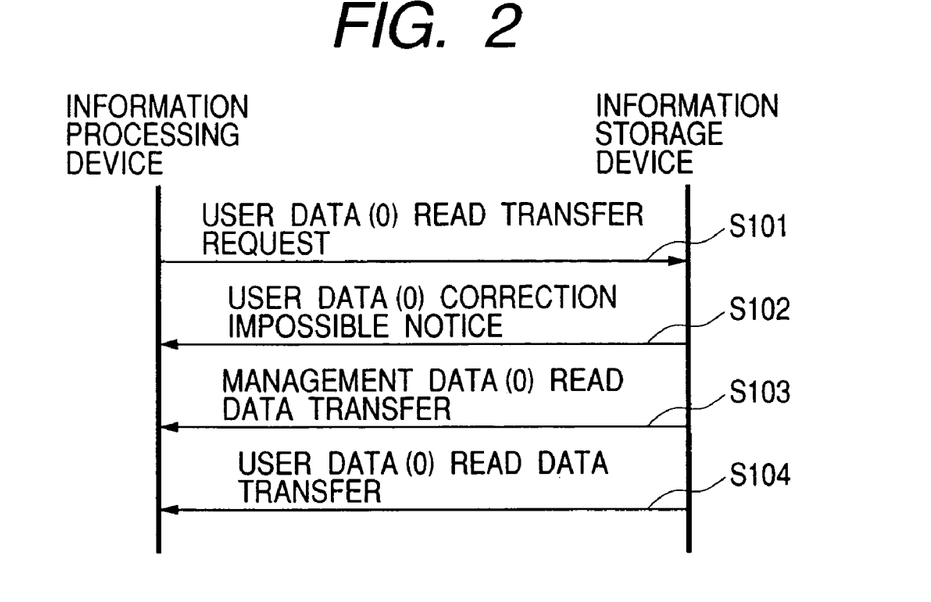
FIG. 2 is a flowchart of read transfer processing when ECC correction is impossible, in the information processing system of FIG. 1.
Figure 3:
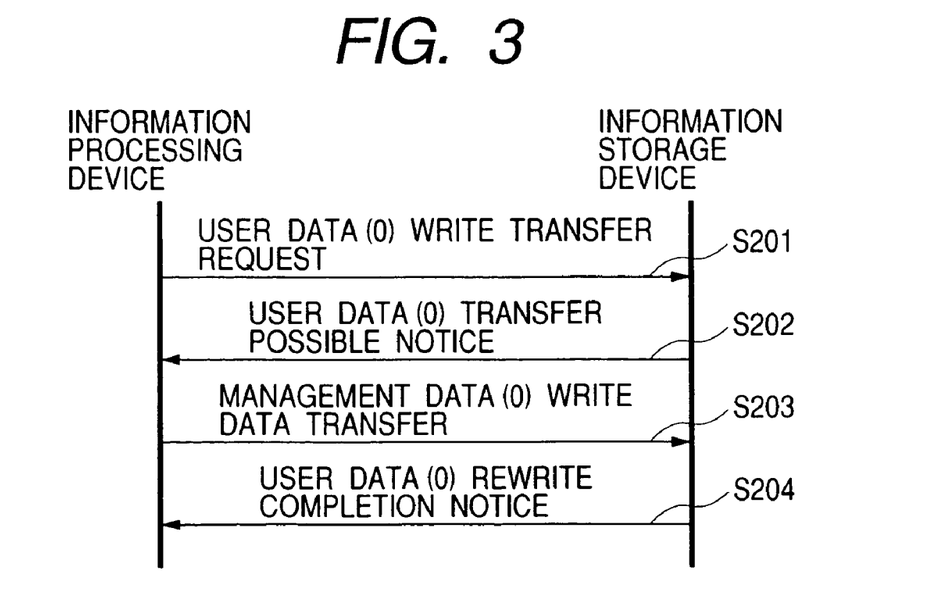
FIG. 3 is a flowchart of write transfer processing for user data in the information processing system of FIG. 1.
Figure 4:
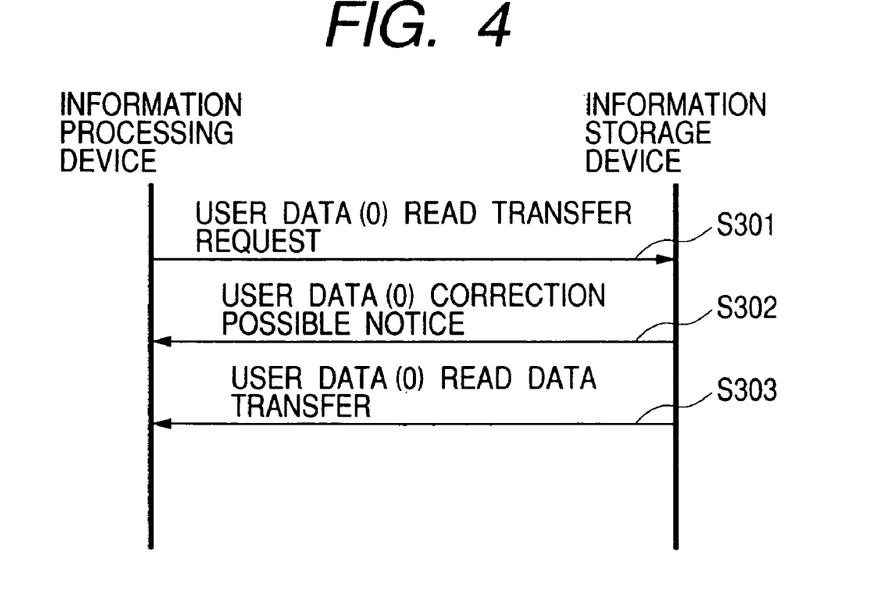
FIG. 4 is a flowchart showing an example of the read transfer processing for user data for which ECC correction is possible, in the information processing system of FIG. 1.
Figure 5:
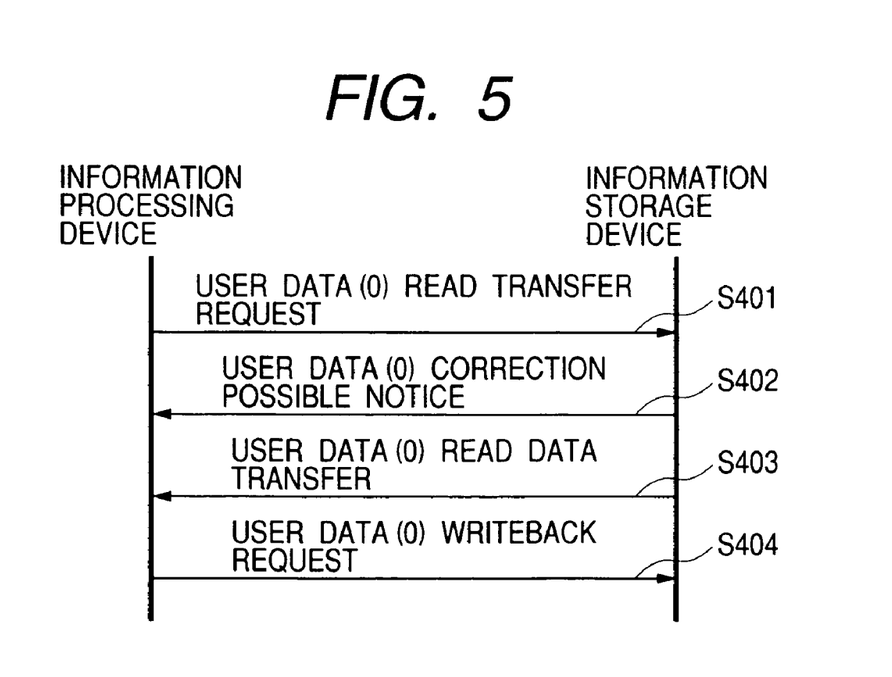
FIG. 5 is a flowchart showing another example of the read transfer processing for user data for which ECC correction is possible, in the information processing system of FIG. 1.
Figure 6:
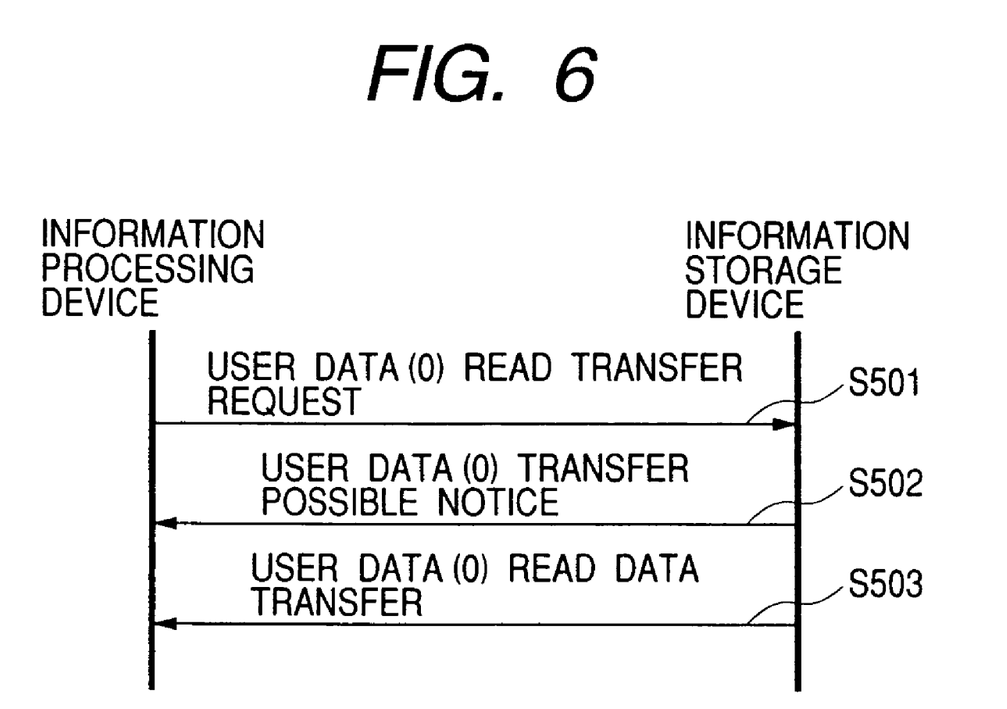
FIG. 6 is a flowchart of read transfer processing when user data is not subjected to ECC correction, in the information processing system of FIG. 1.
Figure 7:
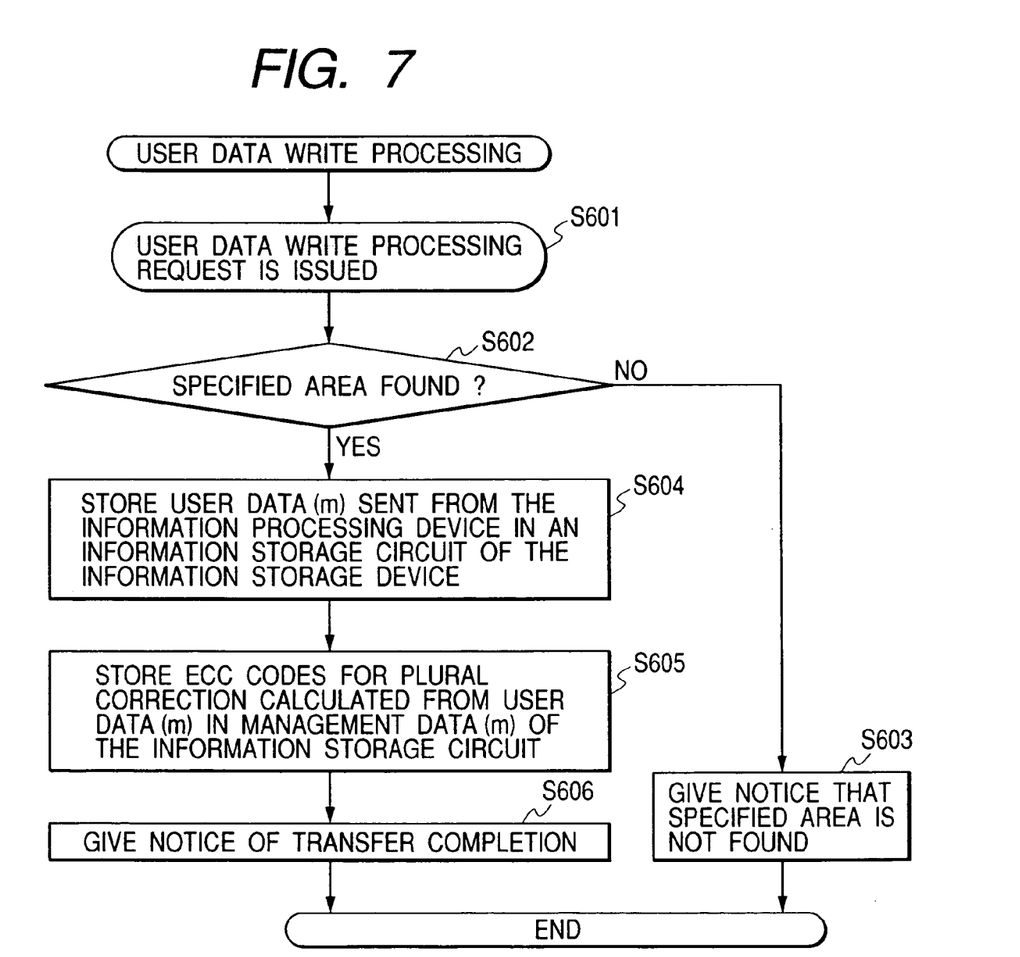
FIG. 7 is a flowchart of internal processing during write transfer of user data in an information storage device provided in the information processing system of FIG. 1.
Figure 8:
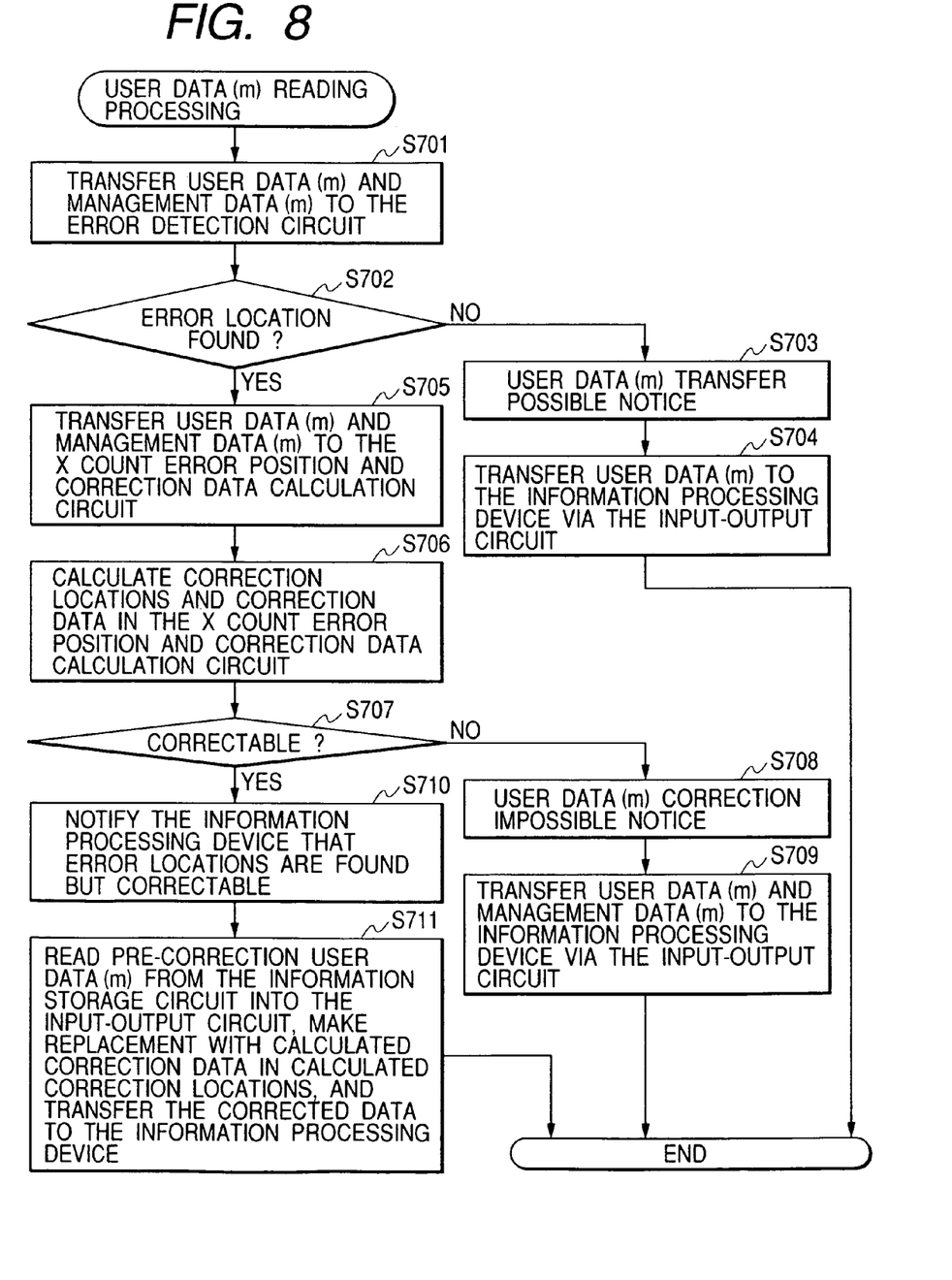
FIG. 8 is a flowchart showing an example of internal processing during read transfer of user data in the information storage device provided in the information processing system of FIG. 1.
Figure 9:
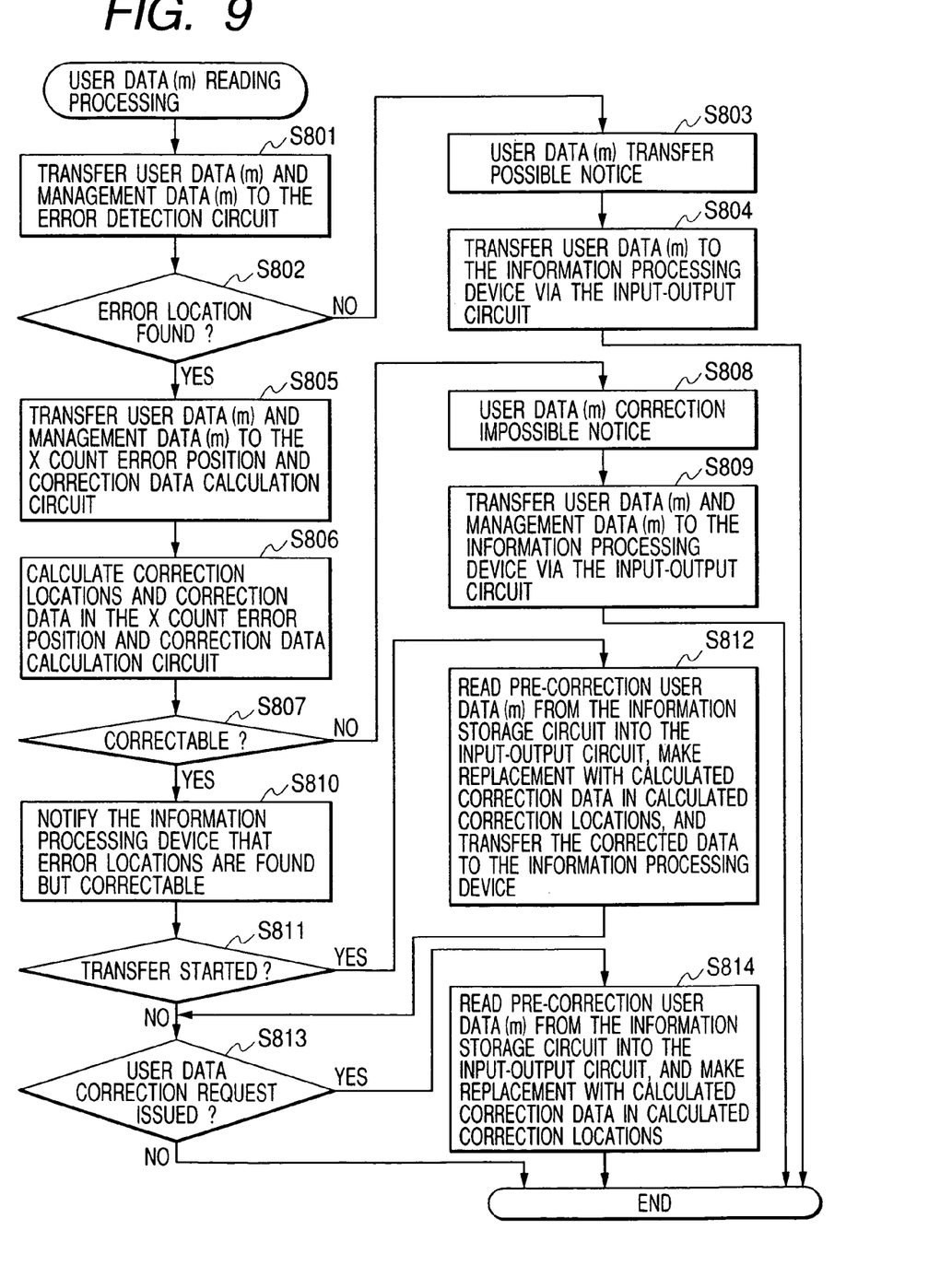
FIG. 9 is a flowchart showing another example of internal processing during read transfer of user data in the information storage device provided in the information processing system of FIG. 1.

FIG. 1 is a block diagram showing an information processing system according to an embodiment of the present invention. FIG. 2 is a flowchart of read transfer processing when ECC correction is impossible, in the information processing system of FIG. 1. FIG. 3 is a flowchart of write transfer processing for user data in the information processing system of FIG. 1. FIG. 4 is a flowchart showing an example of the read transfer processing for user data for which ECC correction is possible, in the information processing system of FIG. 1. FIG. 5 is a flowchart showing another example of the read transfer processing for data for which ECC correction is possible, in the information processing system of FIG. 1. FIG. 6 is a flowchart of read transfer processing when user data is not subjected to ECC correction, in the information processing system of FIG. 1. FIG. 7 is a flowchart of internal processing during write transfer of user data in an information storage device provided in the information processing system of FIG. 1. FIG. 8 is a flowchart showing an example of internal processing during read transfer of user data in the information storage device provided in the information processing system of FIG. 1. FIG. 9 is a flowchart showing another example of internal processing during read transfer of user data in the information storage device provided in the information processing system of FIG. 1.

In this embodiment, the information processing system 1 comprises an information processing device 2 and an information storage device 3, as shown in FIG. 1. The information processing device 2 is a host device which comprises a personal computer, a multi-function terminal, and the like. The information processing device 2 is provided with a Y count error position and correction data calculation circuit (second data correction and calculation part) 2a. The Y count error position and correction data calculation circuit 2a calculates error positions of Y locations and correction data of user data transferred from the information storage device 3.

The information storage device 3 is used as external storage media of the information processing device 2. The information storage device 3 comprises a memory card configured using, e.g., a flash memory and the like.

The information storage device 3 comprises: a control circuit (information processing part) 4; an input-output circuit (transfer processing part) 5; an error detection circuit (transfer processing part, error detection part) 6; an ECC code generation circuit for Y location correction (transfer processing part, management data creation part) 7; an X count error position and correction data calculation circuit (transfer processing part, first data correction and calculation part) 8; an information storage circuit (semiconductor memory) 9; and the like. Although, in this embodiment, one information storage circuit 9 is provided, more than one of the information storage circuit may be provided.

The following components are connected to the control circuit 4 over an internal bus: input-output circuit 5; error detection circuit 6; ECC code generation circuit for Y location correction 7; X count error position and correction data calculation circuit 8; and information storage circuit 9.

The control circuit 4, according to an operation program, reads a program and data stored in the information storage circuit 9 and directs predetermined processing, data writing, and other operations.

The input-output circuit 5 controls data exchange with the information storage circuit 9 and the information processing deice 2. The error detection circuit 6 detects whether an error exists in data having been subjected to reading processing.

The ECC code generation circuit for Y location correction 7 generates ECC (Error Correcting Code) information for Y location correction. The X count error position and correction data calculation circuit 8 calculates X count error positions and correction data.

Errors may be detected not only by using ECC but also by using simple detection functions such as CRC (Cyclic Redundancy Check) and parity check.

X locations and Y locations in error detection have the relationship that X locations <Y locations. There are shown below specific examples of X, Y, and correction length in memory cards using semiconductor memories. If user data is 512 bytes, the number of X locations is one or at most two, and the number of Y locations is X+1 or X+2. The unit of X locations and Y locations is the length of correction length, and if a correction length is one byte, the one byte is counted as one location.

The greater the values of X and Y, and the longer a correction length, the higher the data reliability of the information processing system 1. Conversely, circuit and program sizes and a management area become larger, leading to higher costs. Therefore, it is desirable that the characteristics of the information storage circuit 9 and desired reliability of the information processing system 1 are taken into account to achieve optimization.

The information storage circuit 9 comprises a nonvolatile semiconductor memory such as flash memory. The information storage circuit 9 stores user data (0) to (N), and management data (0) to (N) corresponding to the user data. The management data (0) to (N) include ECC information used for data correction.

The information storage circuit 9, without being limited to a flash memory, may be any memories capable of storing data, such as SRAM (Static Random Access Memory), DRAM (Dynamic RAM), MRAM (Magnetroresistive RAM), and EPROM (Erasable and Programmable Read Only Memory). Although, in this embodiment, a controller and a memory are separate from each other, a hybrid semiconductor may be used which integrates the two and peripheral circuits.

The information processing device 2 and the input-output circuit 5 are connected through an information processing device bus PCB. The information processing device bus PCB, which has mechanical coupling means, may be any of electrically connected contact types or non-contact types transmitting information by information transmission media such as radio waves.

The information processing device 2 is provided with the Y count error position and correction data calculation circuit 2a. The Y count error position and correction data calculation circuit 2a calculates data error positions of Y locations and correction data.

Next, the operation of the information processing system 1 in this embodiment will be described.

First, read transfer processing when ECC correction is impossible, in the information processing system 1 will be described using a flowchart of FIG. 2.

The information processing device 2 requests the information storage device 3 to transfer user data (0) for reading (step S101). If the user data (0) contains more errors than X locations, the information storage device 3 notifies the information processing device 2 that it cannot correct the user data (0) (step S102).

The information storage device 3 transfers management data (0) corresponding to the user data (0) to the information processing device 2 (step S103), and then transfers the read data of the user data (0) (step S104).

The information processing device 2, if necessary, corrects the transferred read data by the Y count error position and correction data calculation circuit 2a, and if not necessary, performs predetermined processing without performing error corrections.

Write transfer processing for user data (0) will be described using a flowchart of FIG. 3.

When a request to transfer user data (0) for writing is issued from the information processing device 2 to the information storage device 3 (step S201), the information storage device 3 notifies the information processing device 2 of transferring the write data of the user data (0) (step S202). Thereafter, the write data of the user data (0) is successively transferred to the information storage device 3 from the information processing device 2 (step S203).

Upon termination of write processing for the user data (0), the information storage device 3 notifies the information processing device 2 of completion of write processing (step S204).

Next, read transfer processing for which ECC correction is possible will be described using a flowchart of FIG. 4.

The information processing device 2 requests the information storage device 3 to transfer user data (0) for reading (step S301). If the user data (0) contains not more errors than X locations, the information storage device 3 notifies the information processing device 2 that the user data (0) can be corrected (step S302). Thereafter, the information storage device 3 corrects error locations of the user data (0), and then transfers the corrected data to the information processing device 2 (step S303).

In FIG. 4, the user data (0) having been subjected to ECC correction is only transferred to the information processing device 2, and the user data (0) within the information storage device 3 is not written back and the processing terminates.

Another example of the read transfer processing for data for which ECC correction is possible will be described using the flowchart of FIG. 5. In FIG. 5, user data (0) having been subjected to ECC correction is transferred to the information processing device 2, and user data (0) within the information storage device 3 is also written back to the user data (0) having been subjected to ECC correction.

The information processing device 2 requests the information storage device 3 to transfer user data (0) for reading (step S401). If the user data (0) contains not more errors than X locations, the information storage device 3 notifies the information processing device 2 that the user data (0) can be corrected (step S402).

After correcting error locations of the user data (0), the information storage device 3 transfers the corrected user data (0) to the information processing device 2 (step S403). Thereafter, the information processing device 2 requests the information storage device 3 to write back the user data (0) having been subjected to ECC correction (step S404), and the information storage device 3 writes the user data (0) back to the corrected user data.

Although, in the flowchart of FIG. 5, a writeback request is made after transfer of the user data, the writeback request may be made earlier, and then the user data may be transferred.

Next, read transfer processing when user data is not subjected to ECC correction will be described using the flowchart of FIG. 6.

The information processing device 2 requests the information storage device 3 to transfer user data (0) for reading (step S501). Upon receipt of the request, the information storage device 3 notifies the information processing device 2 that the user data (0) can be transferred (step S502), and then transfers the read user data (0) to the information processing device 2 (step S503).

The write transfer processing for user data shown in FIG. 3 in the information storage device 3 will be described using a flowchart of FIG. 7.

When a request to write user data (m) is issued from the information processing device 2 (step S601), the control circuit 4 determines whether a specified area exists in the information storage circuit 9 (step S602).

If the specified area is not found, the control circuit 4 notifies the information processing device 2 that the specified area is not found (step S603), and the processing terminates. If the specified area is found, the control circuit 4 stores the user data (m) transferred from the information processing device 2 in the information storage circuit 9 (step S604).

Thereafter, the ECC code generation circuit for Y location correction 7 generates plural correction ECC codes calculated from the user data (m) and stores them in the information storage circuit 9 as management data (m) (step S605). The control circuit 4 notifies the information processing device 2 of transfer of write data (step S606), and the processing terminates.

By this arrangement, the information processing device 2 does not need to generate ECC codes and can be reduced in processing load. Although, in this embodiment, ECC codes are generated by the information storage device 3, the ECC codes may be generated in a Y count error position and correction data calculation circuit specially provided in the information processing device 2, and stored in the information storage circuit 9 as management data (m).

Next, an example of the read transfer processing of user data in the information storage device 3 will be described using the flowchart of FIG. 8.

When the information processing device 2 issues a request to transfer user data (m) for reading to the information storage device 3, the control circuit 4 transfers the user data (m) and the management data (m) to the error detection circuit 6 (step S701).

The error detection circuit 6 checks the user data (m) for errors (step S702). If the user data (m) contains no error, the control circuit 4 notifies the information processing device 2 that the user data (m) can be transferred (step S703).

Then, the control circuit 4 transfers the user data (m) to the information processing device 2 via the input-output circuit 5 (step S704), and the processing terminates.

In the processing of step S702, if the user data (m) contains errors, the control circuit 4 transfers the user data (m) and the management data (m) to the X count error position and correction data calculation circuit 8 (step S705).

The X count error position and correction data calculation circuit 8 calculates the correction locations and the correction data of the user data (m) (step S706), and judges whether the correction locations are correctable (step S707).

If the correction locations are uncorrectable, that is, there are more correction locations than X locations, the control circuit 4 notifies the information processing device 2 that the user data (m) is uncorrectable (step S708).

Thereafter, the control circuit 4 transfers the user data (m) and the management data (m) to the information processing device 2 via the input-output circuit 5 (step S709), and the processing terminates.

The information processing device 2 receives the user data (m) and the management data (m), and if necessary, corrects the correction locations of the user data (m) by the Y count error position and correction data calculation circuit 2a.

For example, error corrections are not performed for sound data and image data that must be continuously transferred without a break even if they contain several error data (e.g., breaks in sounds, noises of images, etc.), and in the case of important data such as system data, the user data (m) is corrected.

In the processing of step S707, if the correction locations are correctable, that is, there are not more correction locations than X locations, the control circuit 4 notifies the information processing device 2 that error locations exist but can be corrected (step S710).

Then, the control circuit 4 reads pre-correction user data (m) into the input-output circuit 5 from the information storage circuit 9, replaces the pre-correction user data (m) by the correction data in the correction locations calculated by the X count error position and correction data calculation circuit 8, and transfers the corrected data to the information processing device 2 (step S711), and the processing terminates.

In the processing of step S711, when the correction data is replaced in the correction locations calculated by the X count error position and correction data calculation circuit 8 and the corrected data is transferred to the information processing device 2, erroneous user data (m) stored in the information storage circuit 9 may be rewritten to the user data (m) replaced by the correction data.

In this case, by setting commands, control flags, and the like by the information processing device 2, the erroneous user data (m) stored in the information storage circuit 9 is rewritten to the user data (m) automatically corrected.

Next, another example of the read transfer processing of user data in the information storage device 3 will be described using the flowchart of FIG. 9.

When a request to transfer user data (m) for reading is issued from the information processing device 2 to the information storage device 3, the control circuit 4 transfers the user data (m) and the management data (m) to the error detection circuit 6 (step S701).

The error detection circuit 6 checks the user data (m) for errors (step S802). If the user data (m) contains no error, the control circuit 4 notifies the information processing device 2 that the user data (m) can be transferred (step S803). The control circuit 4 transfers the user data (m) to the information processing device 2 via the input-output circuit 5 (step S804), and the processing terminates.

In the processing of step S802, if the user data (m) contains errors, the control circuit 4 transfers the user data (m) and the management data (m) to the X count error position and correction data calculation circuit 8 (step S805).

Then, the X count error position and correction data calculation circuit 8 calculates the correction locations and the correction data of the user data (m) (step S806), and judges whether the correction locations are correctable (step S807).

If the correction locations are uncorrectable, that is, there are more correction locations than X locations, the control circuit 4 notifies the information processing device 2 that the user data (m) is uncorrectable (step S808).

The control circuit 4 transfers the user data (m) and the management data (m) to the information processing device 2 via the input-output circuit 5 (step S809), and the processing terminates. The information processing device 2 receives the user data (m) and the management data (m), and if necessary, corrects the correction locations of the user data (m) by the Y count error position and correction data calculation circuit 2a.

In the processing of step S807, if the correction locations are correctable, that is, there are not more correction locations than X locations, the control circuit 4 notifies the information processing device 2 that error locations exist but can be corrected (step S810).

Then, the control circuit 4 judges whether a transfer start request is issued from the information processing device 2 (step S811). When a transfer is started, the control circuit 4 reads pre-correction user data (m) into the input-output circuit 5 from the information storage circuit 9, replaces the pre-correction user data (m) by the correction data in the correction locations calculated by the X count error position and correction data calculation circuit 8, and transfers the corrected data to the information processing device 2 (step S812).

In the processing of step S811, if no transfer start request is issued from the information processing device 2, or if the processing of step S812 terminates, the control circuit 4 judges whether a request to correct user data is issued from the information processing device 2 (step S813).

If a request to correct user data is issued from the information processing device 2, the control circuit 4 reads pre-correction user data (m) into the input-output circuit 5 from the information storage circuit 9, replaces the pre-correction user data (m) by the correction data in the correction locations calculated by the X count error position and correction data calculation circuit 8, and stores the corrected data in the information storage circuit 9 (step S814).

The processing terminates after processing of the step S814 or when a request to correct user data is not issued from the information processing device 2.

According to this embodiment, minor error corrections having a high probability of occurrence are performed in the information storage device 3 and major error corrections having a low probability of occurrence are performed in the information processing device 2, so that the information processing device 2 can be reduced in overhead.

Since only minor error corrections are performed in the information storage device 3, the circuit size of the information storage device 3 can be reduced.

Furthermore, since whether to perform major error corrections can be selected by the information processing device 2, an information processing system 1 having optimum reliability in accordance with data can be constructed.

Although the invention made by the inventor has been described in detail based on an embodiment of the present invention, it goes without saying that the present invention is not limited to the embodiment and may be modified in various ways without departing from the scope and sprit of the present invention.

Effects obtained by representative examples of the invention disclosed in this application will be briefly described.

(1) Minor error corrections having a high probability of occurrence are performed in an information storage device and major error corrections having a low probability of occurrence are performed in an information processing device, so that the information processing device can be reduced in overhead.

(2) Since only minor error corrections are performed in the information storage device, the circuit size of the information storage device can be reduced.

(3) Since whether to perform major error corrections can be selected by the information processing device, an optimum information processing system in accordance with data to be handled can be constructed.

(4) Because of the above (1) to (3), the performance and reliability of the information processing system can be significantly increased.

What is claimed is:

1. An information storage device comprising:
one or more semiconductor memories;
an information processing part that, according to an operation program, reads data stored in the one or more semiconductor memories, writes data to the one or more semiconductor memories, and performs other operations; and
a transfer processing part that, if read data read from the semiconductor memories contains minor a count of which is equal to or less than a predetermined count, corrects the minor errors and transfers the data, and if the read data contains major errors the count of which is more than the predetermined count, transfers the data without correcting the major errors,
wherein the transfer processing part comprises:
a management data creation part that creates management data used for data corrections from write data transferred from the outside;
an error detection part that detects whether the read data contains error locations, based on the read data and the management data created by the management data creation part; and
a first data correction and calculation part that, when errors are detected by the error detection part, calculates correction locations and correction data of the read data, and judges whether the read data contains major errors or minor errors, and
wherein the information processing part, when the first data correction and calculation part judges that the read data contains minor errors, replaces the read data by the correction data in the correction locations thereof calculated by the first data correction and calculation part, and transfers the corrected data to the outside, and when the first data correction and calculation part judges that the read data contains major errors, transfers the read data to the outside without correcting the read data.

2. The information storage device according to claim 1,
wherein the first data correction and calculation part, when the read data contains N or fewer errors, judges the errors as minor errors, and if the read data contains N plus one or more errors, judges the errors as major errors.

3. An information storage device comprising:
one or more semiconductor memories;
an information processing part that, according to an operation program, reads data stored in the one or more semiconductor memories, writes data to the one or more semiconductor memories, and performs other operations; and
a transfer processing part that, if read data read from the semiconductor memories contains one error, corrects the error and transfers the read data, and if the read data contains two or more errors, transfers the read data without correcting the errors,
wherein the transfer processing part comprises:
a management data creation part that creates management data used for data corrections from write data transferred from the outside;
an error detection part that detects whether the read data contains error locations, based on the read data and the management data created by the management data creation part; and
a first data correction and calculation part that, when an error is detected by the error detection part, calculates correction locations and correction data of the read data, and judges whether the read data contains two or more errors, or one error, and
wherein the information processing part, when the first data correction and calculation part judges that the read data contains one error, replaces the read data by the correction data in the correction location thereof calculated by the first data correction and calculation part, and transfers the corrected data to the outside, and when the first data correction and calculation part judges that the read data contains two or more errors, transfers the read data to the outside without correcting the read data.

* * * * *